Figure 1:
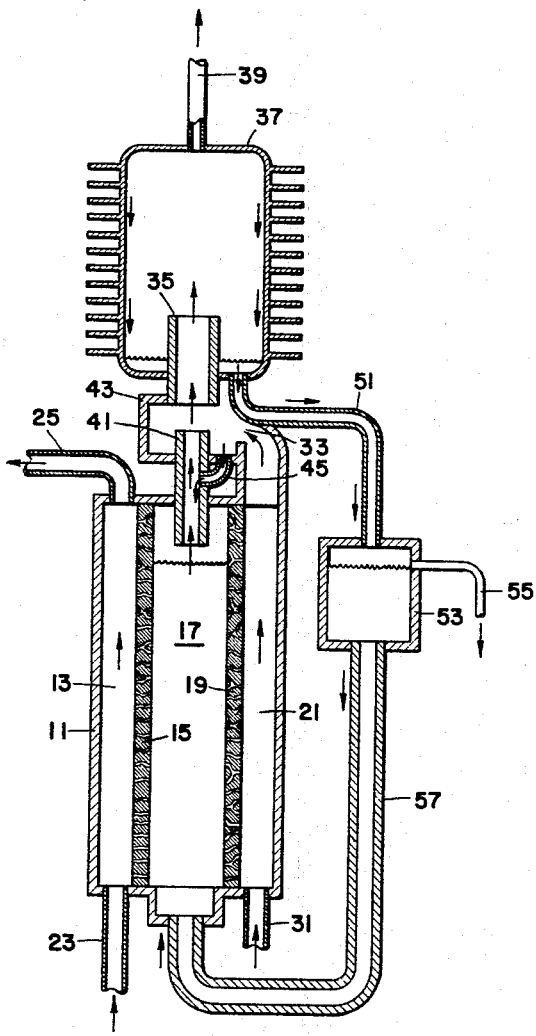

Nov. 22, 1966   M. A. WEISS ET AL   3,287,167
METHOD AND APPARATUS FOR CONTROLLING OPERATIONS OF FUEL CELLS
Filed Oct. 18, 1961

Malcolm A. Weiss
Lindsay I. Griffin, Jr.   INVENTORS
SMALL, THOMAS, DUNHAM & MARX
BY W. O. Heilman
PATENT ATTORNEY

United States Patent Office 3,287,167
Patented Nov. 22, 1966

3,287,167
METHOD AND APPARATUS FOR CONTROLLING OPERATIONS OF FUEL CELLS
Malcolm A. Weiss, Union, and Lindsay I. Griffin, Jr., New Providence, N.J., assignors to Esso Research and Engineering Company, a corporation of Delaware
Filed Oct. 18, 1961, Ser. No. 145,893
13 Claims. (Cl. 136—86)

The present invention relates to a method and apparatus for controlling the operations of fuel cells. It has particular application to a method and apparatus for controlling the operating efficiency of fuel cells of the type which utilize aqueous electrolytes, and particularly of the type which consume hydrogen-containing fuels. More specifically, the invention has particular application to an aqueous electrolyte type cell operating on fuels which contain both hydrogen and carbon, whereby combustion products include water or water vapor and a carbon oxide such as CO or $CO_2$, particularly the latter.

In order to obtain high operating efficiency for fuel cells operating on hydrogen-containing fuels such as hydrocarbons and oxygenated hydrocarbons such as alcohols, ethers, ketones, aldehydes and the like, it often is desirable to operate at elevated temperatures. In common with most chemical reactions, operating efficiency and rate usually increase very substantially with increasing operating temperature. Experiments have shown that for fuel cells operating on gaseous or liquid hydrocarbons, lower alcohols such as methanol, ethanol and the like, and related materials, desirable operating temperatures may be as high or higher than the boiling point of water. That is, under normal atmospheric pressures, and at elevations near sea level, an operating temperature in excess of 212° F., or above the normal boiling point at normal atmospheric pressure is frequently desirable. Temperatures as high as 300° F. or higher are frequently not only permissible, but are highly desirable because of the efficient operations they produce. However, at such temperatures, the water inventory of the aqueous electrolyte is rapidly reduced and the cell will quickly become inoperative unless the water inventory is maintained. Moreover, the operating temperature itself must be controlled to keep it within proper limits. This is necessary to maintain operating efficiency and also to prevent undue temperature rises which might damage the cell or equipment associated therewith.

According to the present invention it has been found that a cell of the type described above may be operated under conditions such that net water is removed from the electrolyte, even though it is produced therein, provided that effective and controllable means for returning water to the electrolyte are supplied. Thus the water vapor carried out of the cell is passed through heat exchange to effect its condensation. Part or all of the condensate is returned, either continuously or at frequent intervals, to the electrolyte. This is done in such a manner that the water inventory in the electrolyte is maintained substantially constant.

In one embodiment of the invention, vaporized or entrapped or entrained water is removed from the stream of elastic fluid leaving the cell which may comprise steam or vapor, with or without other gases such as carbon dioxide, carbon monoxide (which may sometimes be produced in small quantities), and spent oxidant gases such as air or oxygen, or depleted air comprising mainly nitrogen with a subnormal oxygen content.

Condensate from a heat exchanger can be returned through suitable controlled means to the electrolyte. Liquid water entrained in the elastic fluid is preferably separated prior to passing to the heat exchanger. This entrained liquid water is then preferably returned directly to the electrolyte by suitable trap or conduit means.

Condensed vapors return to the electrolyte under control of automatic means for sensing and maintaining the electrolyte water inventory. Such control means may comprise either a simple reservoir for maintaining a desired pressure level or liquid level, or they may comprise valve means automatically controlled by sensing the liquid level in the electrolyte zone.

From the foregoing it will be understood that the invention has as its object the substantially automatic and continuous maintenance of a desired liquid operating level, but it also includes the effective control of fuel cell temperature. By proper control of heat exchange conditions, the desired operating temperature within the cell can be maintained. If this should involve excessive water circulation, the circulation of other fluids through the cell may be controlled. For example, fuel may be recycled with external heat exchange.

Figure 2:
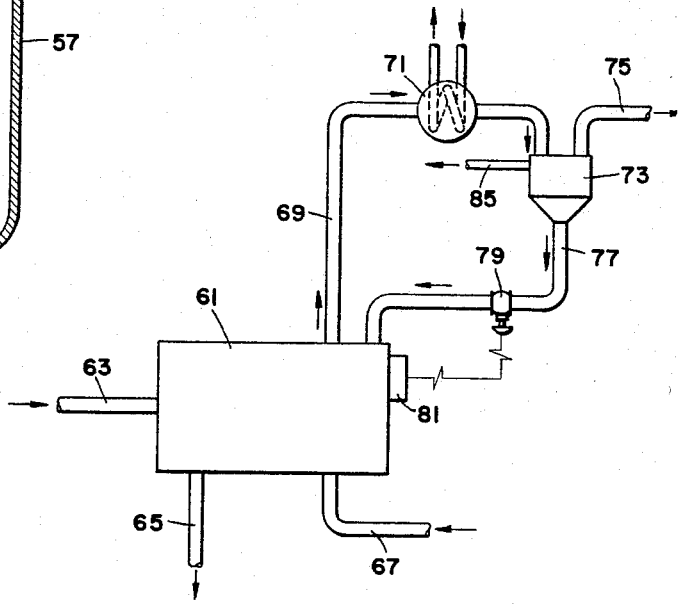

The invention will be more particularly understood by reference to the accompanying drawings wherein:

FIG. 1 is a diagrammatic sectional elevational view of a preferred embodiment; and FIG. 2 is a diagrammatic front elevation of an alternative system.

Referring first to FIG. 1, a fuel cell 11 is shown in simplified form as comprising a fuel compartment 13, fuel electrode 15 formed of suitable porous material, electrolyte zone 17, air or oxidizer electrode 19, and the air compartment or zone 21. In the normal operation of the cell, fuel is supplied from inlet line 23 and may be supplied at a rate in considerable excess of that required for the operation. Excess fuel is removed through outlet 25 and is taken to storage or to heat exchange for subsequent recycling to the cell.

On the oxidizer side, oxygen-containing gas, preferably air, is introduced through inlet 31 and passes out through outlet 33 and a conduit 35 into a heat exchanger 37. The cooled spent air is passed to the atmosphere through outlet 39.

In the electrolyte zone, water is being formed by reaction of the fuel and oxygen, assuming that the fuel contains hydrogen. The fuel may be pure hydrogen or a hydrogen-containing gas such as methane, ethane, ethylene, propane, etc. Alternatively it may be a liquid such as one of the liquid hydrocarbons, or one of the oxygenated hydrocarbons such as methanol, ethanol and the like. In the use of oxygenated materials which are water soluble, the fuel in some cases may be introduced directly into the electrolyte, in which case the cell construction and operation may be modified and in some cases simplified, as is well known in the art.

At normal ambient temperature conditions, water may be formed in the electrolyte faster than in evaporates, in which case the electrolyte level would tend to rise, the electrolyte becoming diluted. It is more efficient, however, to operate the cell at such a temperature that substantial quantities of water vapors are evolved from the cell. Since the electrodes are porous, some water may migrate from the electrolyte or from the inner part of the oxidizer electrode into the air stream. Also, water may evaporate from the electrode into the gaseous stream, from which it may be recovered by condensation. In such cases, water vapor will be carried up through conduit 35 into the heat exchanger. Vapors from the electrolyte zone 17 pass through a conduit 41 to join the elastic fluid passing through conduit 35. Where the electrolyte fluid is agitated as a result of heat or of rapid gas evolution, for example where $CO_2$ is being produced, liquid water may be entrained in the vapor stream passing upwardly through line 41. In this case the liquid will largely be separated in separating zone 43 located between the conduits 41 and 35. Liquid water so separated can return to the electrolyte compartment through a return line 45 from which it will run down the side walls of conduit 41 back into the electrolyte compartment.

The elastic fluid stream which, as noted above, may comprise air or spent air, water vapor and carbon dioxide, etc. where carbonaceous fuels are used, passes into the heat exchanger 37. Depending upon the capacity of the heat exchanger and relative temperature gradients, some or most of the water vapors will be condensed. These are drawn off at the bottom of the heat exchanger through a line 51 to a liquid level control reservoir 53. This reservoir is provided with an overflow spout 55 at the level desired for the electrolyte liquid surface inside the electrolyte compartment. Reservoir 53 connects through a U-tube 57 to the bottom of the electrolyte chamber By this means, the water in the reservoir 53 maintains the electrolyte level within the cell. Depending upon the ingredients and temperature of the electrolyte, specific gravity may be somewhat different from that of the water in reservoir 53, in which case the relative heights of liquid surface may be adjusted by proper location of overflow 55. With the system just described, it will be apparent that condensed water flowing back through line 51 into the reservoir 53 will automatically maintain the water inventory in the electrolyte, and will assist in maintaining or controlling fuel cell operating temperature. Supplementary controls may be made as indicated above by circulation of fuel in excess of cell consumption rates.

Referring now to FIG. 2, an alternative system is shown wherein a fuel cell 61 is connected with an external condenser and heat exchange circuit. The cell 61 may be of essentially the same internal structure as that of FIG. 1, or it may have other forms. As shown, fuel can be supplied through a line 63 and surplus fuel taken off through line 65. Oxidizing gas, preferably air, is supplied through line 67 and this gas which is an elastic fluid, may be taken overhead except for the oxygen actually consumed, to entrain water vapors and other ingredients such as $CO_2$. This elastic fluid stream passes through line 69 to heat exchanger 71 and thence to a separator 73. From here the cooled gases such as spent air, $CO_2$, etc., may be passed to the atmosphere. Alternatively the carbon dioxide may be taken separately from the electrolyte zone, in which case some water vapors would be lost if not condensed separately. If desired, the effluent stream after water separation may be stripped of its carbon dioxide by suitable separation methods well known in the art.

Liquid water separated from the gas stream which passes out through line 75 may be taken through line 77 from the bottom of the separator 73. In line 77 there is provided a control valve 79 which is operated by a liquid level controller 81 in communication with the electrolyte in the fuel cell. In response to demands from the electrolyte, the valve 79 will be opened to admit water to re-enter the cell, either continuously or at frequent intervals to maintain a substantially constant water inventory in the electrolyte.

In case the condensation rate exceeds the demands of the fuel cell, either momentarily or for longer periods, means are provided for disposing of the excess. An overflow outlet 85 is provided in separator 73 through which surplus condensate may be drained. In normal operation a small amount of water will be retained in the separator so as to be on call when demanded by the electrolyte level control device 81. Where condensation is proceeding faster than electrolyte replenishment is required, the surplus merely overflows.

In systems where multiple cells or multiple banks of cells are used, uniform electrolyte levels may be maintained either by separate return systems or by interconnecting the cells so that the electrolyte will seek a common level. The latter is preferable where the cells are relatively steady and immobile.

It will be apparent that by control of the electrolyte level and by temperature control, and to some extent by control of either of these factors alone, the operating efficiency of the cell may be closely regulated. Variations in details of the apparatus and the steps of operation regulation will suggest themselves to those skilled in the art. It is intended therefore to cover obvious variations within the scope of the claims below so far as prior art permits.

What is claimed is:

1. The method of controlling operation of a fuel cell which consumes hydrogen-containing fuel and thereby produces water and which utilizes an aqueous electrolyte wherein at least part of said water is produced, which method comprises operating said cell under elevated temperature conditions such that water is removed from said electrolyte faster than it is produced therein, and such that at least part of said removed water is in vapor form, subjecting the removed water vapor to heat exchange to condense at least part of said vapor, returning condensed water from said condensation to said electrolyte, and controlling said water return so as to keep the water inventory in said electrolyte substantially constant.

2. Method according to claim 1 wherein the operating conditions comprise temperature above 212° F.

3. Method according to claim 1 wherein the operating conditions comprise a temperature above the normal atmospheric pressure boiling point of water.

4. Method according to claim 1 wherein the operating conditions comprise rapid evolution of non-aqueous gases from said electrolyte with consequent entrainment of liquid water.

5. Method according to claim 1 wherein the operating conditions comprise rapid evolution of a carbon oxide gas from said electrolyte.

6. Method according to claim 1 wherein the operating conditions comprise an elevated temperature plus evolution of carbon dioxide from said electrolyte.

7. Method according to claim 1 wherein entrained liquid water is substantially separated from gas accompanying said water and is returned directly to said electrolyte.

8. Method according to claim 1 wherein condensed water is passed to a liquid level-maintaining reservoir directly connected with said electrolyte.

9. A method for controlling a fuel cell which comprises passing oxidizing air through said cell, passing a hydrogen-containing fuel through said cell whereby water vapor is formed in said cell, passing spent air and water vapor from said cell to heat exchange whereby water vapor is condensed and separated from said spent air, and returning condensate water to said cell to maintain a desired water inventory and also to control temperature in said cell.

10. Apparatus for controlling the operating efficiency of a fuel cell of the aqueous electrolyte type consuming hydrogen-containing fuel and thereby producing water, which comprises, in combination, a heat exchanger, means for passing a fluid comprising water vapor through said exchanger to produce condensed water, means for returning said condensed water to said cell, and automatic means for controlling said water return so as to maintain a substantially constant water inventory.

11. Apparatus according to claim 10 in which the controlling means comprises an electrolyte level controller.

12. Apparatus for controlling the water inventory in the aqueous electrolyte of a fuel cell operating at temperature above the boiling point of water at atmospheric pressure on hydrogen-containing fuel and thereby producing water as a combustion product, which comprises, in combination, a condenser, means for passing an elastic non-liquid fluid including water vapor through said condenser whereby at least some of said vapor is condensed, and means including a liquid level controller for returning condensate to said electrolyte as required to maintain a substantially constant water inventory in said electrolyte.

13. Apparatus according to claim 12 including separate means for separating entrained liquid water from said elastic fluid and returning it directly to said cell.

References Cited by the Examiner
UNITED STATES PATENTS

| | | | |
|---|---|---|---|
| 1,182,759 | 5/1916 | Emanuel | 136—86 |
| 2,925,455 | 2/1960 | Eidensohn | 136—86 |
| 3,002,039 | 9/1961 | Bacon | 136—86 |
| 3,009,327 | 11/1961 | Weil | 136—86 |

FOREIGN PATENTS 667,298  2/1952  Great Britain.

WINSTON A. DOUGLAS, *Primary Examiner.*
JOHN R. SPECK, *Examiner.*
H. FEELEY, *Assistant Examiner.*